(12) United States Patent
Hecker

(10) Patent No.: US 10,504,019 B1
(45) Date of Patent: Dec. 10, 2019

(54) PRESSED SECURITY TRACE COMPLETION

(71) Applicant: NCR Corporation, Atlanta, GA (US)

(72) Inventor: Weston Lee Hecker, Bismarck, ND (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 16/227,806

(22) Filed: Dec. 20, 2018

(51) Int. Cl.
   *G06K 19/077* (2006.01)
   *G06Q 20/34* (2012.01)
   *G06Q 20/38* (2012.01)
   *G06K 19/06* (2006.01)

(52) U.S. Cl.
   CPC ...... *G06K 19/07773* (2013.01); *G06Q 20/341* (2013.01); *G06Q 20/385* (2013.01); *G06K 2019/06253* (2013.01)

(58) Field of Classification Search
   CPC ... G06K 19/07773; G06K 2019/06253; G06Q 20/341; G06Q 20/385
   See application file for complete search history.

(56) References Cited

U.S. PATENT DOCUMENTS

| | | | |
|---|---|---|---|
| 2007/0152829 A1* | 7/2007 | Lindsay | G06K 19/0717 340/572.3 |
| 2008/0061148 A1* | 3/2008 | Tanner | G06K 19/0723 235/492 |
| 2010/0140361 A1* | 6/2010 | Lee | G06K 19/07345 235/492 |
| 2018/0039987 A1* | 2/2018 | Molino | G06Q 20/34 |

* cited by examiner

*Primary Examiner* — Laura A Gudorf
(74) *Attorney, Agent, or Firm* — Schwegman, Lundberg & Woessner

(57) ABSTRACT

A contactless card is provided. The card in a non-activated state lacks a circuit between a chip on the card and an antenna on the card. When one or more contact points on the card are pressed, the circuit is formed and the chip is powered on through an antenna that receives signals from a card reader. Once powered on, in an embodiment, the chip produces a one-time transaction specific token for authenticating a transaction using the card.

4 Claims, 5 Drawing Sheets

PRESSED SECURITY TRACE COMPLETION

BACKGROUND

Chip-based payment cards have been mandated in the industry. It is believed that a chip-based card provides superior security because a transaction is only valid when the chip on the card is powered on and communicating with the card reader.

A popular trend that is growing in the industry is wireless chip-based cards that use radio waves captured in a card antenna to power the chip on. This allows for contactless transactions. Once the chip is powered on by the wireless radio signals, the chip generates a one-time use token that is provided to the card reader for a transaction. These contactless chip-based cards are tapped or waved in front of the card reader instead of being dipped or swiped into and through the card reader.

However, these contactless cards have antennas that are continually listening for a radio signal. The radio signal powers the chip and activates the card. Once activated, the chip generates a unique transaction token for conducting a transaction. Consequently, thieves have figured out that all they need to is provide a wireless radio signal near someone possessing a chip-based contactless card and the card is activated, such that a transaction can be performed using the card and the generated transaction token.

Accordingly, because of the increasing use of contactless payment cards, theft is becoming more commonplace because such cards are not as secure as was originally believed to be the case in the industry.

SUMMARY

In various embodiments, methods and chip-based cards for pressed security trace completion are presented.

According to an embodiment, a method for pressed security trace completion is presented. Disconnected wires in a chip-based card are urged together to form a connected wire and a circuit between a chip on the chip-based card and an antenna on the chip-based card. The chip is powered on and activated based on signals received by the antenna and provided to the chip over the circuit.

DETAILED DESCRIPTION

Figure 1A:
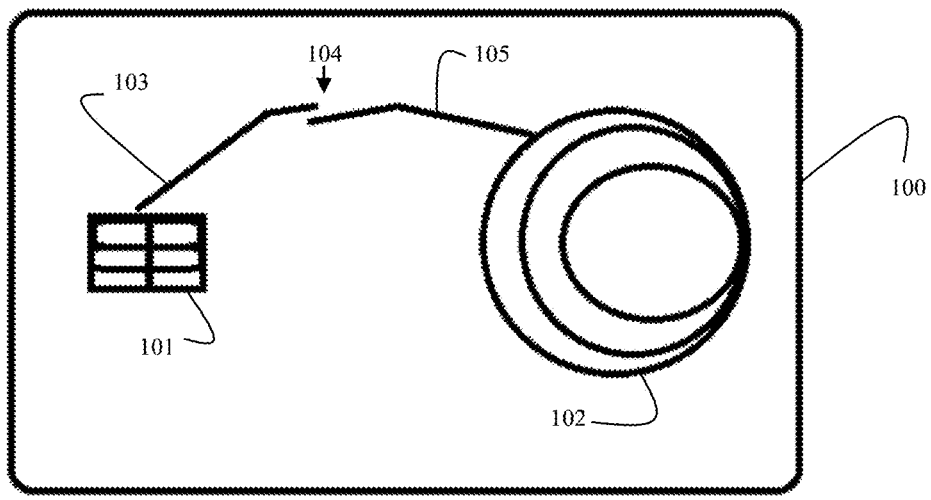
FIG. 1A is a diagram of a chip-based card with pressed security trace completion, according to an example embodiment.

FIG. 1A is a diagram of a chip-based card 100 with pressed security trace completion, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the techniques of chip-based card with pressed security trace completion processing, presented herein and below.

As used herein and below, the terms "customer," "consumer," and "user" may be used interchangeably and synonymously.

A conventional contactless chip-based payment card is susceptible to wireless theft. The thieves can use a wireless card reader to perform a "cook off transaction." The generated transaction token is saved by the thieves for replaying at a later date. The wireless card readers can be purchased off the Internet along with software and can obtain a unique transaction token from a conventional contactless card from up to 10 feet away from a user possessing the card. The wireless reader emits an electromagnetic field captured by the antenna of the card, which powers the chip of the card on and causes the card to pair with the reader and provide a unique transaction token for a transaction.

The conventional contactless card is modified by the card 100 as described herein and below. This prevents the chip 101 of the card 100 from being activated unless the card user/holder takes an affirmative action to press on the card in a designated area 104. When this is done, the pressed area causes a circuit to be formed between two disconnected but overlapping wires 103 and 105. Once the circuit is formed, the chip 101 can be powered on through the antenna 102 by a wireless electromagnetic signal provided by a contactless card reader.

Figure 1B:
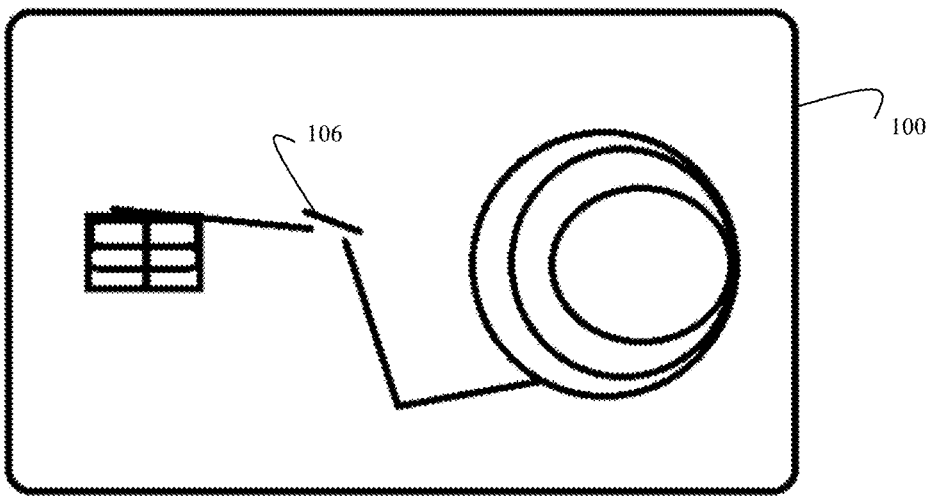
FIG. 1B is a diagram of another chip-based card with pressed security trace completion, according to an example embodiment.
Figure 1C:
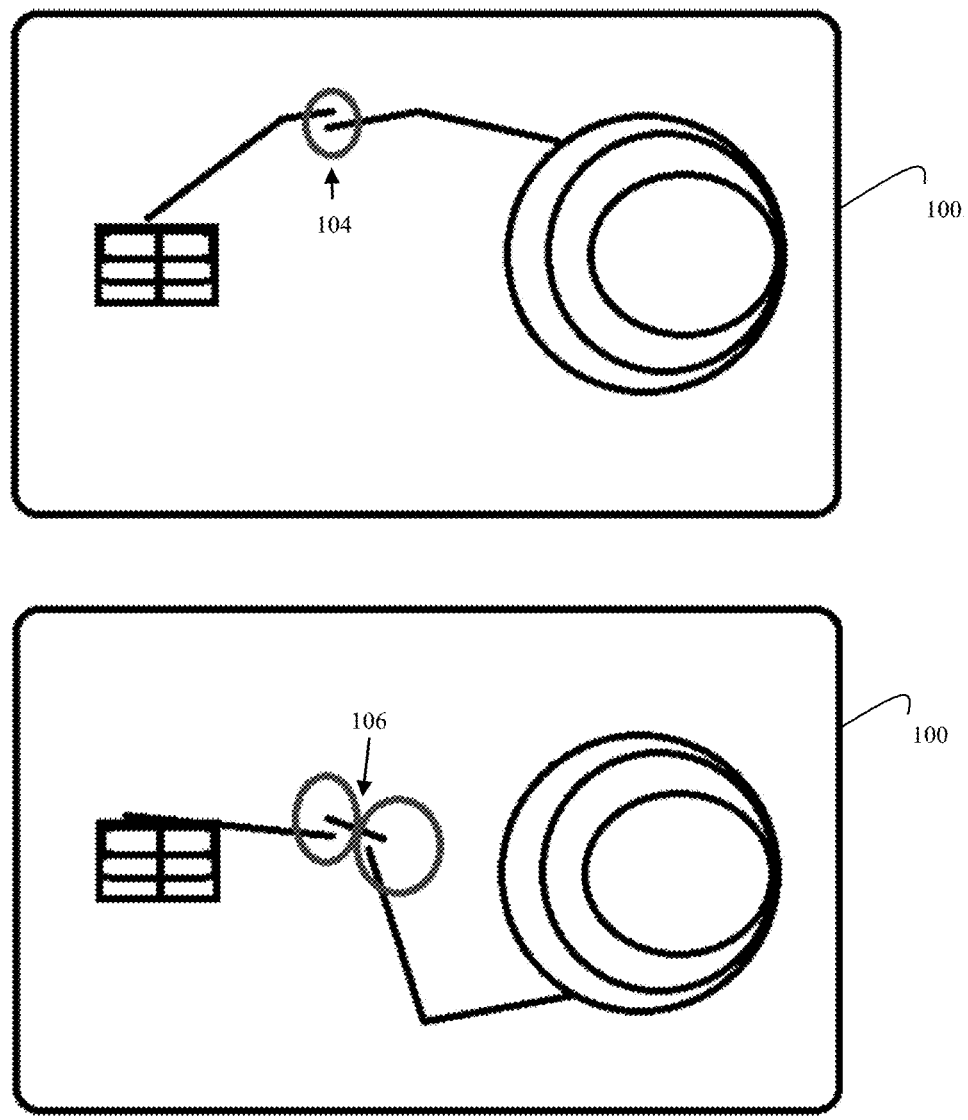
FIG. 1C illustrates diagrams showing the connection points for the chip-based cards presented in the FIGS. 1A and 1B, according to an example embodiment.
Figure 1D:
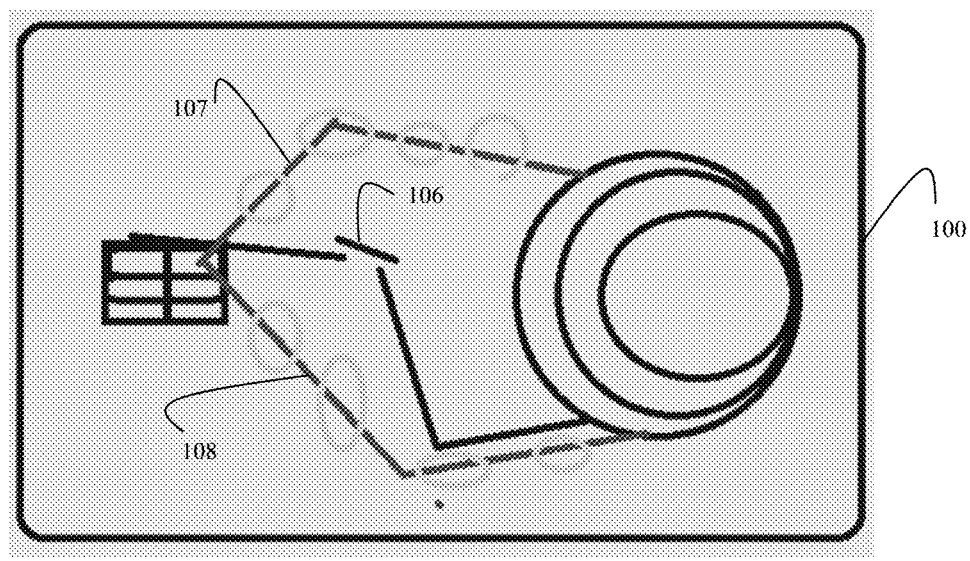
FIG. 1D illustrates still another chip-based card with pressed security trace completion, according to an example embodiment.

There can be several variations of the novel card 100, three such variations are shown in the FIGS. 1A, 1B, and 1D.

The card 100 of the FIG. 1A includes a processor chip 101 powered on by wireless radio signals received by an integrated antenna 102. The chip 101 is connected to the antennal 102 by two wires 103 and 105. The wires 103 and 105 are overlapped one on top of the other and not touching 104 while the card 101 is in a non-transaction and non-listening mode. While the wires 103 and 105 are not touching 104, the chip 101 is unable to be powered on through wireless signals provided to the antenna 102 because the wire 105 connected to the antenna 102 is not able to complete a circuit with the wire 103 connected to the chip 101.

In an embodiment, the space (void area) 104 between the non-communicative wires 103 and 105 is filled with a wax-based substance (that is non-conductive). When a user of the card 100 desires a transaction, the location of the overlapping wires 103 and 105 on the face of the card 100 are pressed by the user. This forces one wire on top 103 or 105 downward to touch the other wire 103 or 105 and completes a circuity, such that the chip 100 can be powered on by a card reader supplying the radio signal. The wax-based substance maintained in the void area 104 keeps the wires 103 and 105 together in the circuit for a short period of time during which the user can complete a transaction. After this short period of time the wires 103 and 105 separate and go back to their non-touching non-circuit forming original position on the card 100.

In an embodiment, the substance that fills the void 104 is any non-conductive liquid or semi-solid liquid material.

In an embodiment, the void 104 is just air, such that the card 100 has to be held by the user and pressed in the area of 104 when waiving the card in front of a card reader to conduct a transaction with the card reader.

The FIG. 1B illustrates a different arrangement for the non-touching wires 103 and 105, a third wire 106 is placed over or under the wires 103 and 105 that when pressed forces the third wire 106 down touching both wires 103 and 105 forming a circuit. Again, the material included in a space between the wire 106 and the other two wires 103 and 105 can be any non-conductive liquid, wax, or just air.

The location where the user needs to press on the face of the card 100 can be hidden and not clearly marked, such that someone that usurps the card 100 from the possession of the owner would not know where to press the card 100 to cause the circuit to be formed, which activates the chip 101. This can provide an added security feature.

In an embodiment, the card 100 includes two disconnected points that must be pressed utilizing both hands of the user to form the circuit for purposes of activating the chip 101.

In an embodiment, the wire 103 or 105 is partially looped within the card in a natural non-activated state for the chip 101. The card includes a tab mechanism on the front of the card that needs to be slid by the user to one side, which causes the looped wire 103 of 105 to extend and connect with the other wire 103 or 105 forming a circuit for transactions with a contactless card reader. Here, the chip 101 remains activated until the sliding mechanism is slid back in an opposite direction to break the circuit.

The circles shown in the FIG. 1C illustrates the points along the face of the card 100 of the FIG. 1A and the card 100 of the FIG. 1B that a user needs to press down to connect the chip 101 to the antenna 102 of the card 100.

The FIG. 1D illustrates two additional ground wires 107 and 108 that if pressed by a user on those areas along the wires (identified by small circles in the FIG. 1D) cause the chip 101 to ground out and deactivate. This illustrates a card 100 configuration with false press points (the small circles) that deactivate the chip 101 when pressed. This provides still more security to activating the chip 101 by explicitly deactivating the chip 101 when pressed in an incorrect location on the front of the card.

In an embodiment, the circuit is formed when the user pressed the back of the card 100 in a designated location 104 or 106.

In an embodiment, the circuit is formed when the user presses either the front or the back of the card 100 in a designated location 104 or 106.

The novel card 100 and its variations (FIG. 1A, FIG. 1B, and FIG. 1D) can be used in place of any existing contactless card without changing or modifying any existing transaction based software. This includes any software needed by phone-based apps that activate the card 100 for an online shopping transaction with a one-time transaction code. This novel card 100 can also replace existing EMV cards having smart touch or contactless capabilities without modifying any of the transaction-based software.

To achieve the added security of the card 100 and its variations, the only thing that needs to be changed is the wiring 103 and 105 connecting the chip 101 to the antenna 102 such that in a non-pressed state the chip 101 is unable to receive power because there is no circuit formed with the antenna 102. As mentioned above and in some embodiments, the press may maintain and hold the circuit for a short period of time (such as when wax is inserted in the void 104 between overlapping wires 103 and 105. Furthermore, in some cases the press has to be maintained for the transaction such that the circuit is only maintained while being pressed (air in the void 104). In some embodiments, two presses are needed to form the circuit (the circuit can be maintained for a short time after the two pressed or can be only maintained while the two presses are being made). In some cases, the circuit is formed through a new sliding mechanism placed on the card 100.

In an embodiment, the card 100 is a non-payment contactless card, such as a work security card for access to areas of a building.

In an embodiment, the card 100 is a payment contactless card, which can include a modified EMV card.

As used herein, "contactless" is intended to include a touch mechanism or bump mechanism used with Near Field Communication (NFC) readers.

The card 100 includes contact points that require a press or presses to power the chip 101 through the antenna 102, once powered, the chip 101 generates a one-time transaction token that authenticates use of the card 100 for a transaction with a card reader.

These and other embodiments are now discussed with reference to the FIGS. 2-3.

Figure 2:
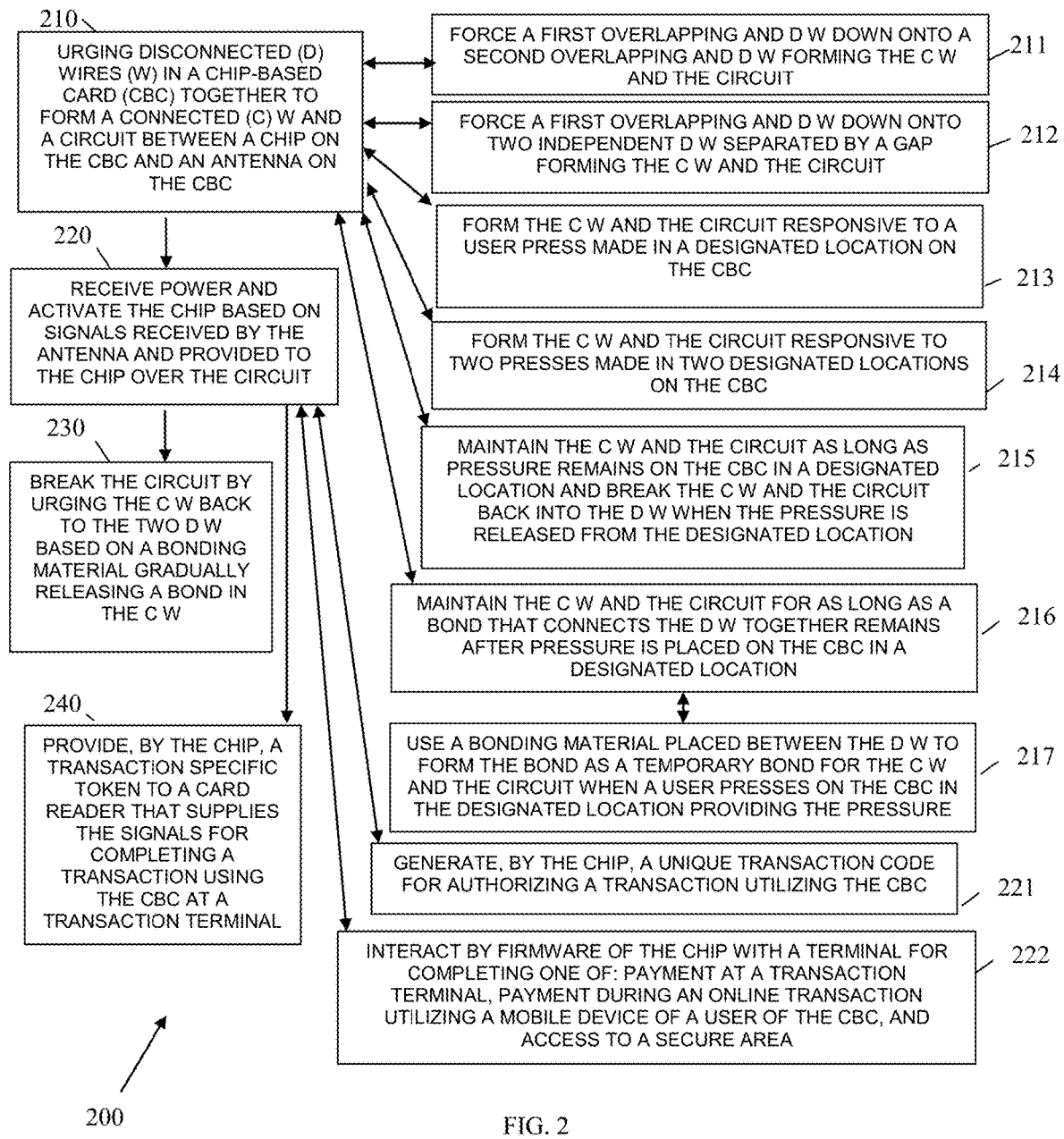
FIG. 2 is a diagram of a method for activating a chip-based card having pressed security trace completion, according to an example embodiment.

FIG. 2 is a diagram of a method 200 for activating a chip-based card having pressed security trace completion, according to an example embodiment.

The chip-based card 100 is electromechanically structured in the manners discussed above with the FIGS. 1A-1D. When pressure or presses are made to the structure of the card 100, the steps of the action are performed as noted below. Some steps entail execution of firmware by the chip/processor embedded in the card 100.

At 210, disconnected wires in the chip-based card 100 are urged together to form a connected wire and a circuit between a chip/processor 101 embedded in the card 100 and an antenna 102 embedded in the card 100. The circuit when formed provides signal vibration from the antenna 102 over the connected wire to the chip 101, which activates and powers the chip 101. Upon power on or activation, the firmware of the chip 101 performs processing to generate a unique code or token, which may be provided to complete a transaction or gain access to a secure asset.

In an embodiment, at 211, a first overlapping and disconnected wire is forced down onto a second overlapping and disconnected wire forming a single connected wire and the circuit. This was shown and illustrated in the FIGS. 1A and 1C (top diagram of FIG. 1C).

In an embodiment, at 212, a first overlapping and disconnected wire is forced down onto two independent disconnected wires that are separated by a gap. When the first wire is forced down a single connected wire and the corresponding circuit is formed. This was shown and illustrated in the FIGS. 1B, 1C (bottom diagram of FIG. 1C), and 1D.

In an embodiment, at 213, responsive to a press or pressure applied by a user to a front or back surface of the card 100 in a designated location on the card 100, the connected wire is formed and the circuit is established on the card 100.

In an embodiment, at 214, responsive to two presses made in two designated locations on a front or back surface of the card 100, the connected wire is formed and the circuit is established on the card 100.

In an embodiment, at 215, the circuit and connected wire is maintained as long as pressure remains on the card 100 in a designated location on a front or back surface of the card 100. When the pressure or press is released from the card 100, the connected wire becomes the disconnected wires and the circuit is broken.

In an embodiment, at 216, the connected wire and the circuit is maintained as long as a bond that connects the disconnected wires together remains after pressure is placed on the card 100 in one or more designated locations on the front or back surface of the card 100. This was discussed above with reference to the FIGS. 1A-1D a material (such as wax) is inserted into a void area, such that when pressure is applied at the contact point, the wires are connected and the material maintains adhesion of the two wires together until the adhesion wears off.

In an embodiment of 216 and at 217, a bonding material is placed between the disconnected wires to form the bond as a temporary bond for the connected wire and the circuit when a user presses on the card 100 in the designated location.

At 220, the card 100 receives power and activates (powers on) the chip 101 based on signals (such as electromagnetic radio signals) received by the antenna 102 and provided from the antenna 102 to the chip 101 over the circuit. The circuit is temporary and the initial and natural state of the card 100 is to not have the circuit formed between the antenna 102 and the chip 101. Pressure or presses have to be made at designated contact points on the front or back surface of the card 100 to form the circuit.

In an embodiment, at 221, a unique transaction code is generated by the firmware of the chip 101 when the chip is powered on over the circuit. The unique transaction code authorizes a transaction that is utilizing the card 100 as a form of payment for the transaction.

In an embodiment, at 222, firmware of the chip 101 when powered on over the circuit interacts with a terminal for completing one of: a payment at a transaction terminal, a payment during an online transaction utilizing a mobile device of a user of the card 100, and access to a secure area.

In an embodiment, at 230, the circuit is broken by urging the connected wire back to the disconnected wires based on a bonding material releasing a bond in the connected wire.

In an embodiment, at 240, the firmware of the chip 101 when powered on over the circuit provides a transaction specific token to a card reader that supplies the signals for purposes of completing a transaction using the card 100 at a transaction terminal. In an embodiment, the transaction terminal is a SST, a POS terminal, an ATM, or a kiosk.

Figure 3:
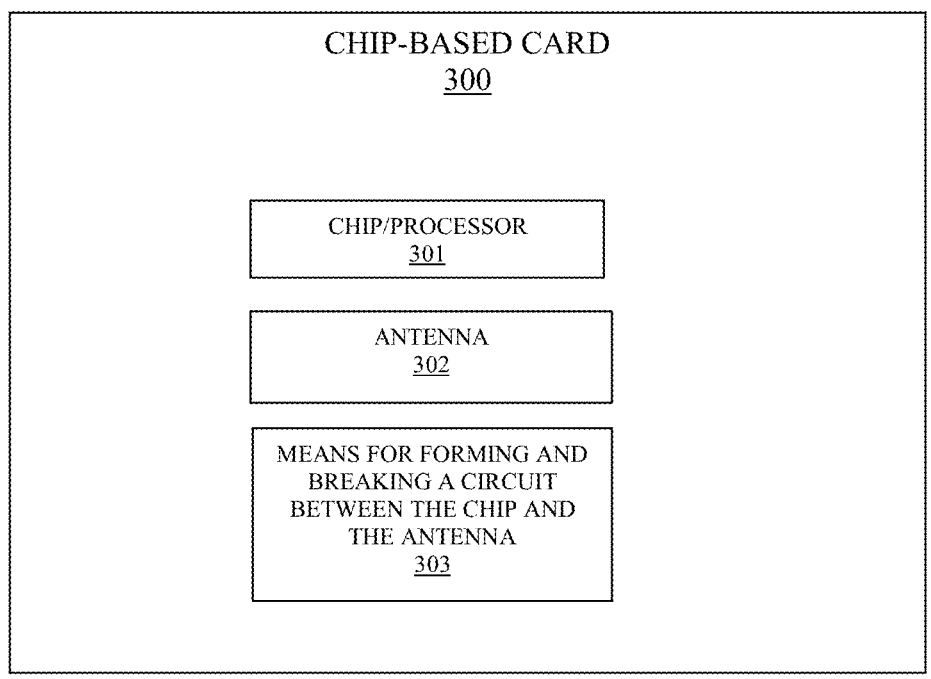
FIG. 3 is a diagram of yet another chip-based card with pressed security trace completion, according to an example embodiment.

FIG. 3 is a diagram of a chip-based card 300, according to an example embodiment. The card 300 includes a variety of hardware components and software components (firmware). The firmware of the card 300 is programmed and reside within memory and/or a non-transitory computer-readable medium and execute on the chip/processor 301 of the card 300. The card 300 may communicate and is powered by a wireless signal of a card reader.

In an embodiment, the card 300 is any of the cards 100 discussed above with the FIGS. 1A-1D and 2.

The card 300 includes a chip/processor 301, an antenna 302, and a means 303 for forming a circuit between the chip 301 and the antenna 302.

In an embodiment, the means 303 is any of the overlapping and disconnect wires that are connected to form the circuit between the chip 301 and the antenna 302 when pressure or a press is made on the card 300 in one or more contact points as was discussed above with the FIGS. 1A-1D and 2.

In an embodiment, the card 300 is a contactless payment card for performing transactions at a transaction terminal.

In an embodiment, the card 300 is a contactless payment card used by a mobile phone for performing an online transaction.

In an embodiment, the card 300 is a wireless access card used to gain access to a secure area or a secure asset.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A chip-based card, comprising:
   a chip;
   an antenna;
   a first wire connected to the chip on a first end and disconnected at a second end;
   a second wire connected to the antenna on a first end and disconnected at a second end;
   at least one contact point;
   wherein the second ends are configured to be connected to form a circuit between the chip and the antenna at the at least one contact point;
   an area that separates the second ends, wherein the second ends overlap one another within the area without touching, and wherein the second ends are configured to connect with one another within the area to form the circuit when a press is made on the contact point; and
   a non-conductive liquid that fills the area and configured to form a temporary bond that keeps the second ends connected to form the circuit until the temporary bond subsides after the press.

2. The chip-based card of claim 1 further comprising, a third wire that overlaps the second ends and bridges a connection between the second ends, wherein the third wire configured to connect with the second ends to form the circuit when one or more presses is made on the contact point.

3. A chip-based card, comprising:
   a chip;
   an antenna;
   a first wire connected to the chip on a first end and disconnected at a second end;

a second wire connected to the antenna on a first end and disconnected at a second end;
at least one contact point;
wherein the second ends are configured to be connected to form a circuit between the chip and the antenna at the at least one contact point; and
one or more ground wires associated with second contact points, wherein the second contact points configured to power off the chip when pressed.

4. A chip-based card, comprising:
a chip;
an antenna;
a first wire connected to the chip on a first end and disconnected at a second end;
a second wire connected to the antenna on a first end and disconnected at a second end;
at least one contact point;
wherein the second ends are configured to be connected to form a circuit between the chip and the antenna at the at least one contact point; and
a slider configured to extend the second end of the second wire over to and connect with the second end of the first wire when the slider is moved on the chip-based card to form the circuit.

* * * * *